United States Patent [19]

Reik

[11] Patent Number: 5,048,658
[45] Date of Patent: Sep. 17, 1991

[54] TORQUE TRANSMITTING APPARATUS

[75] Inventor: Wolfgang Reik, Bühl/Baden, Fed. Rep. of Germany

[73] Assignee: Luk Lamellen und Kupplungsbau GmbH, Bühl, Fed. Rep. of Germany

[21] Appl. No.: 233,337

[22] Filed: Aug. 17, 1988

[51] Int. Cl.⁵ ............................................. F16D 3/80
[52] U.S. Cl. ......................... 192/106.2; 192/70.17; 192/103 F; 74/574; 464/24
[58] Field of Search ............ 192/70.17, 103 F, 106.2, 192/61; 74/574; 464/24

[56] References Cited

U.S. PATENT DOCUMENTS

| | | | |
|---|---|---|---|
| 4,662,239 | 5/1987 | Worner et al. | 192/70.17 |
| 4,708,228 | 11/1987 | Leigh-Monstevens | 192/85 CA |
| 4,732,250 | 3/1988 | Maucher et al. | 192/70.17 |
| 4,739,866 | 4/1988 | Reik et al. | 192/70.17 |
| 4,790,792 | 12/1988 | Bopp | 192/106.2 |

FOREIGN PATENT DOCUMENTS 0108393  5/1984  European Pat. Off.

Primary Examiner—Allan D. Herrmann
Assistant Examiner—Andrea Pitts
Attorney, Agent, or Firm—Peter K. Kontler

[57] ABSTRACT

In a torque transmission system having at least two inertial masses that can be rotated relative to each other, of which one can be connected to the engine and of which the other can be connected to or uncoupled from a gear box through a clutch, in order to provide a better match of the damping capacity to each particular application and in order to increase the service life of the system and to broaden the possible sphere of use, between the two inertial masses there is a hydraulic system through which the moment is transmitted.

54 Claims, 6 Drawing Sheets

TORQUE TRANSMITTING APPARATUS

BACKGROUND OF THE INVENTION

The present invention relates to a torque transmission system, this being installed, in particular, in the drive train of a motor vehicle, between the engine and the gear box, and having at least two inertial masses that can be rotated relative to each other, one of these being connected with the engine, and in which the other can be coupled to or disconnected from the gear box by means of a clutch.

Systems of this kind are known, for example, from DE-OS 34 40 927. These known systems have energy storage devices that act in the peripheral direction, such as coil springs, and energy storage devices that act in an axial direction, that ensure that there is damping between the two inertial masses. To this end, the energy storage devices that act in the axial direction and in the peripheral direction are supported against disk-like components of the two inertial masses, it being possible for these to make a limited movement or rotation relative to each other. This relative movement between the disk-like components, on which the energy storage devices are supported, ensures that the energy storage devices that are effective in the peripheral direction can be pretensioned or compressed, and that the energy storage devices that act in the axial direction can rub on at least one of the disk-like components.

OBJECTS OF THE INVENTION

It is the task of the present invention to improve systems of this kind, in particular their resistence to wear, and thereby increase their useful service life. In addition, the function, which is to say in particular the damping effect, of systems of this kind is to be improved. Furthermore, it is to be made possible to change the damping characteristics of torque transmission systems of this kind as a function of a specific parameter, so that an optimal filtering of oscillations that occur between the motor and the gear box is possible over the whole speed range of the engine. An additional objective of the invention is to ensure a simple construction as well as cost-effective production.

SUMMARY OF THE INVENTION

According to the present invention, this has been achieved in that the two inertial masses are connected to each other through a system that effects the transmission of force through a hydraulic medium that is under pressure. The use or the application of the hydraulic system between two inertial masses, as in the present invention, to achieve a defined characteristic curve as a function of a specific operating parameter such as, the speed of the motor, the power that is transmitted from one inertial mass to the other inertial mass by determining or regulating the pressure of the medium and/or the volume of hydraulic medium that is delivered by the hydraulic system. Furthermore, by establishing the volume of hydraulic medium delivered by the hydraulic system it is possible to achieve slippage between the two inertial masses, which can be defined or limited for specific operating conditions. The hydraulic system can be effective as a hydrostatic damping system between the two inertial masses because of slippage which is limited or defined in this manner.

In an advantageous manner, the hydraulic system that acts between the two inertial masses can incorporate or form a hydraulic clutch. When this is done, it may be expedient if this coupling is a hydrostatic clutch. For the construction of the torque transmission system it can be advantageous if the two inertial masses are connected to each other through a force pump that operates according to the rotational principle such as, in particular, a gear-type pump. In a particularly advantageous manner lubricating agent may be suitable as the hydraulic or viscose medium, which can also be blended, in which connection, for many applications, it can be advantageous if a paste-like agent such as grease is used, which undergoes no or at least the smallest possible change in state over the whole temperature range that may occur, which is to say undergoes no essential change in its viscosity. Such a grease or paste-like medium ensures that once the engine has been shut off the grease that has become liquid does not collect at the lowest point and thereby put the system in a state of imbalance. For other applications however, it can also be advantageous if a liquid medium such as oil is used, such oil displaying a consistent viscosity throughout the whole temperature range that may occur. For the construction and for the operation of the torque transmission system it can be of particular advantage if the flow of force—seen in a flow of torque from the engine to the gear box—flows from the crankshaft to one of the inertial masses,
from the input portion of the hydraulic system,
from the output portion of the hydraulic system,
to the other inertial mass,
to the friction clutch.

For the function and for the production of the torque transmission system it can be advantageous if the hydraulic system that acts between the two inertial masses has a plurality of planetary pinions that are arranged around the periphery, about the axis of rotation of the system. These pinions can advantageously engage with a sun gear that can expediently be provided radially within these planetary-type pinions.

In order to reduce the pressure pulses that are caused by the pinions in the pressure curve of the pump, and which can be attributed to an unequal delivery as a consequence of the spacing of the teeth, the planetary pinions can be arranged around the periphery of the sun gear and relative to each other in such a manner that the engagement of the teeth of at least some of the planetary pinions with the teeth of the sun gear are offset relative to each other, which means that the teeth of at least some of the planetary pinions are not in the same position relative to a connecting line between the axis of rotation of the sun gear and the axis of rotation of the planetary pinions. An arrangement of this kind means that the pressure pulses generated by the individual planetary pinions are shifted relative to each other so that the overall pressure generated by the pump is more constant.

In order to reduce leakage losses in the pump and thereby keep the slippage that occurs between the two inertial masses as a result of these losses to a minimum, it can be advantageous if there is a sealing plate on at least one side of the planetary pinions. When this is done, the side of the sealing plate that is remote from the planetary pinion can be connected to the pressure side of the hydraulic system or the pump. In order to ensure trouble-free sealing of the gear-type pump even at lower pressures, it can also be advantageous if an energy-storage device acts on the side of the sealing plate that faces away from the pinion. Because of the fact that the side of the sealing plate that is turned away from a pinion is acted on by the pressure of the pump and optionally by an energy storage device, the pinion is restrained axially, whereby when the pinion is turned additional frictional damping can occur and this can be independent of the pressure within the pump.

A particularly advantageous and simple configuration of the torque transmission system can result if there is at least one common sealing plate for all the planetary pinions, which can then form a circular component.

In order to improve the operation of the torque transmission system, the planetary pinions can be arranged on pins so as to be able to rotate. For the construction of the torque transmission system it can be expedient if the planetary pinions are supported by the first inertial mass, and the sun gear is provided on the second inertial mass.

According to a development of the invention various valves or choke connections can be provided between the pressure side and the suction side of the hydraulic system or the pump; these will have an effect on the torque that can be transmitted by the torque transmission system and thus on the slippage that occurs between the inertial masses. Thus, between the pressure side and the suction side of the hydraulic system there can be at least one choke and/or a one-way valve.

In an advantageous manner, choke valves can be used as chokes and these can be inserted in one of the inertial masses and connected through channels with the pressure and the suction side of the hydraulic system. A simplification of the construction of the torque transmission system can be achieved if, in the event that both the choke and a non-return valve are required, at least one choke valve is used that can also be configured as a non-return valve. It can be advantageous if a choke is provided between the pressure side and the suction side of each planetary pinion.

Depending on the embodiment of these valves, different characteristics, in particular different torque curves or different slippage curves, can be imparted to the clutch that is formed by the hydraulic system, such as, for example, the gear-type pump. It can be particularly advantageous if these valves can be operated as a function of the rotational speed of the engine or of one of the inertial masses and/or of the other inertial mass or the gear box input shaft, respectively, which means that the characteristic curve of the hydraulic system and thus of the slippage between the two inertial masses is dependent on the above-discussed rotational speed.

Furthermore, it can also be expedient if the valves are dependent on other or additional parameters that can be affected by operating conditions between the engine and the gear box. Thus, for example, the degree of choke between the pressure side and the suction side of the hydraulic system can be alterable as a function of the temperature of the medium that is delivered or displaced.

According to a further development of the invention a torsion damper, which can be formed by a rotationally elastic damper, can be provided between the hydraulic system and at least one of the inertial masses. Furthermore, additional friction damping means can be provided between the two inertial masses, which, for example, can form a frictional connection that incorporates some free play. This frictional connection that has some free play can be formed in an advantageous manner by a so-called load friction system. A construction that is particularly advantageous for the function of the torque transmission system can be provided if the rotationally elastic damper between the hydraulic system and one of the inertial masses has at least one input section and at least one output section, between which there are energy storage devices that act in the direction of the periphery.

When this is done, it can be expedient if the hydraulic system and the rotationally elastic damper are connected in series.

A particularly simple construction of the torque transmission system can be ensured in that the sun gear is supported by the input or output section of the rotationally elastic damper or is formed entirely by this. It can also be advantageous for the construction of the torque transmission system if the rotationally elastic damper—viewed in the force transmission path from one to the other inertial mass—is provided between the hydraulic system and the other inertial mass, which can be connected through a clutch to the input shaft of the gear box. Further, it can also be advantageous if the rotationally elastic damper is arranged radially within the hydraulic system. When this is done, it can be appropriate if the rotationally elastic damper and the hydraulic system are arranged, at least approximately, on the same axial level. A particularly advantageous construction of the torque transmission system results if the rotationally elastic damper has two axially spaced disks that form the output section, between which there is a flange that forms the input section of the rotationally elastic damper, which can simultaneously form the sun gear of the hydraulic system. When this is done, it can be advantageous for the construction of the torque transmission system if the flange extends radially beyond the side disks, and has the sun gear for the planetary pinions of the hydraulic system or the pump formed on its outermost periphery.

In an advantageous manner one of the inertial masses can have a chamber that is filled, at least partially, with the viscose medium and in which the rotationally elastic damper and the hydraulic system as well as, optionally, the frictional damping means that acts between two inertial masses can be accommodated. This type of configuration for the torque transmission system can ensure that there is lubrication between the areas of the individual components of the system that lie against each other and which move relative to each other, this then causing a significant reduction in the wear that results from contact friction and also increasing the service life as well as the reliability of the system. As a result of the present invention, friction between the individual coils of the coil springs of the rotationally elastic damper that act in a peripheral direction and the radially outermost edges of the windows that accommodate them in the different disk-like components, which form the input section and/or the output section of the rotationally elastic damper, can be reduced. In an advantageous manner, the chamber for the viscose medium can consist essentially of an annular chamber that is formed essentially from the components of one of the inertial masses. This annular chamber can be formed in an advantageous manner by an outer wall that encloses the rotationally elastic damper as well as by a side wall that extends radially inwards from this and accommodates the rotationally elastic damper between its parts. In an advantageous manner, one inertial mass—which can be connected with the motor—can incorporate the annular chamber. For the construction of the torque transmission system it can also be advantageous if one of the side walls of the annular chamber extends radially between the rotationally elastic damper and the second inertial mass and if a seal is provided between the radially inner areas of this wall and the second inertial mass. For the construction of the torque transmission system it can also be useful if one of the inertial masses supports an annular rim that extends axially, which forms the outer wall of the annular chamber, and if the side wall of the annular chamber that extends between the rotationally elastic damper and the other inertial mass is secured to this rim.

According to an additional feature of the present invention that permits a simple configuration of the torque transmission system, within the radial extent of the axial rim of one inertial mass there can be an axial recess or cut-out in which the planetary pinions can be arranged and supported so as to be able to rotate. When this is done, it can be expedient if the side wall of this recess that is secured to this rim closes in an axial direction. To this end, the side walls can be secured to the face of the axial rim.

In order to avoid any escape of the viscose medium contained in the chamber it can be useful if a seal, for example an O-ring, is provided radially outside the planetary pinions, between the face of the axial rim and the wall that is secured thereto.

A particularly favourable and compact construction can result if the torque transmission system is so configured that the flow of force—viewed in a flow of torque from the engine to the gear box—passes from the crankshaft onto one of the inertial masses,
to the input section of the hydraulic system such as, for example, of a hydraulic clutch,
to the output section of the hydraulic system, as in, for example, a hydraulic clutch,
to the damping system,
to the second inertial mass,
to the clutch.

In a construction of this kind it can be expedient if the second of the inertial masses, which can be connected through a clutch such as a friction clutch to the input shaft of the gear box, supports the friction surface for a clutch plate, which can be clamped between this inertial mass and a pressure plate that is fixed to this so as to be unable to rotate but which can be displaced axially.

In order to damp out oscillations that can occur between the internal combustion engine and the gear box it can be advantageous if the slippage between the two inertial masses amounts to between 20 and 200 revolutions per minute, preferably between 20 and 100 revolutions per minute. In order to keep the losses that occur as a result from the slippage that takes place within reasonable bounds, it can be expedient that this slippage be reduced to a minimum for higher engine speeds. This reduction can take place, for example, at engine speeds between 1000 and 2000 revolutions per minute.

The invention will be described in greater detail below on the basis of the drawings appended hereto. These drawings show the following:

DESCRIPTION OF PREFERRED EMBODIMENTS

Figure 1:
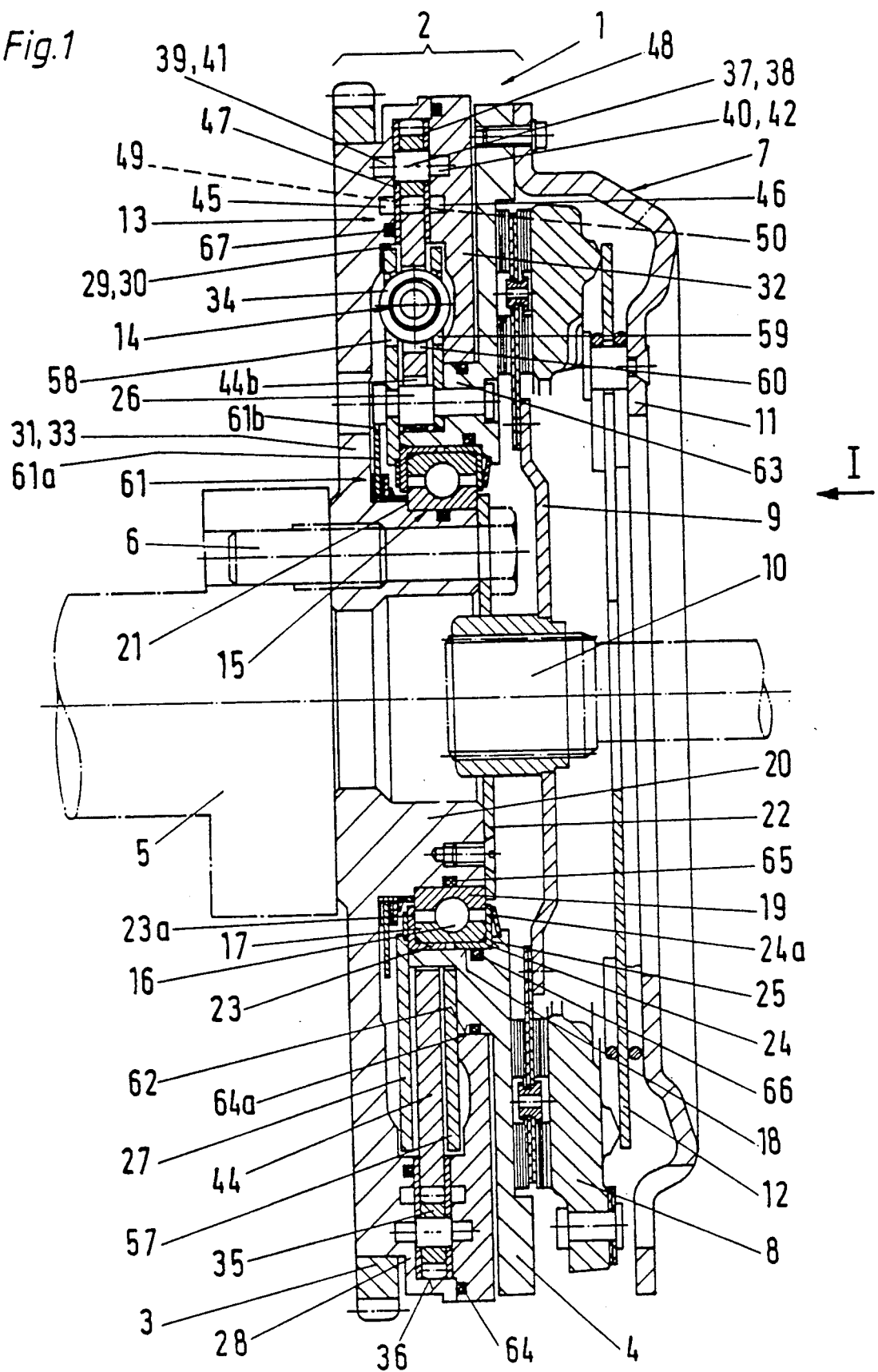
FIG. 1 is an axial sectional view of a system according to the present invention, in FIG. 2 is a fragmentary side elevational view as seen in the direction of arrow I in FIG. 1, with certain parts shown in section.

The torque transmission system 1 that is shown in FIG. 1 and which is used to even out abrupt changes in torque, consists of a flywheel 2 that is divided into two inertial masses 3 and 4. The inertial mass 3 is installed on the crankshaft 5 of an internal combustion engine (not shown in greater detail herein) by means of the attachment bolts 6. A switchable or controllable friction clutch 7 is secured to the inertial mass 4. Between the pressure plate 8 of the friction clutch 7 and the inertial mass 4 there is a clutch plate 9 that is mounted on the input shaft 10 of a gear box (not shown in greater detail herein). The pressure plate 8 of the friction clutch 7 is acted on in the direction of the inertial mass 4 by a disk spring 12 that is supported on the clutch cover 11 in such a manner as to be able to pivot. The inertial mass 4 and thus the fly wheel 2 or the internal combustion engine can be coupled to or uncoupled from the gear box input shaft 10 by operating the friction clutch 7. Between the inertial mass 3 and the inertial mass 4 there is a first hydraulic damping system 13 as well as a further mechanical damping system 14 that is connected with this series, which permit a relative rotation between the two inertial masses 3 and 4.

The two inertial masses 3 and 4 are supported so as to be rotatable relative to each other through a bearing 15. The bearing 15 comprises a roller bearing in the form of a single row ballbearing 16. The outer bearing ring 17 of the roller bearing 16 is arranged in a recess 18 in the inertial mass 4 and the inner bearing ring 19 of the roller bearing 16 is installed on a central cylindrical journal 20 of the inertial mass 3 that extends axially from the crankshaft 5 and into the recess 18.

The inner bearing ring 19 is press-fitted to the journal 20 and is clamped between a shoulder 21 of the journal 20 or of the inertial mass 3, respectively, and a safety washer 22 that is secured to the face end of the journal 20.

The bearing 16 is secured axially relative to the inertial mass 4, in that it is clamped axially between a shoulder 25 of the inertial mass 4 and a disk 27 that is secured to the second inertial mass by means of stand-off bolts 26, with two interposed L-section rings 23 and 24.

Radially on the outside the inertial mass 3 supports an axial annular rim 28 that defines a chamber 29 in which the additional damping system 14 is accommodated.

The chamber 29 is formed essentially by an annular chamber 30. The annular chamber 30 is defined radially outwards by the axial rim 28 and walls 31 and 32 that extend laterally through this radially towards the inside, and between which the damping system 14 is accommodated. The side wall 31 is formed by the radial flange 33 of the inertial mass 3 that extends from the journal 20. The side wall 32 is formed by an essentially non-elastic or rigid cover 32 that extends radially inwards between the damping system 14 and the inertial mass 4 and is secured radially outwards on the inertial mass 3 or on the flange 33, respectively.

In order to ensure the operation of the hydraulic damping system 13 there is a viscose damping or lubricating agent in the chamber 29, this being formed, for example, by oil, grease, a paste-like agent or the like. The level of the damping or lubricating agent, such as, for example, silicon oil, when the system 1 is rotating, which is to say under the action of centrifugal force, depending on the application or on the demands placed on the system, can be laid out in such a way that the areas of the springs 34 of the inner damping system 14, which lie radially outwards, or even the whole radial extent of the springs 34 are immersed in the viscose damping or lubricating agent.

Figure 2:
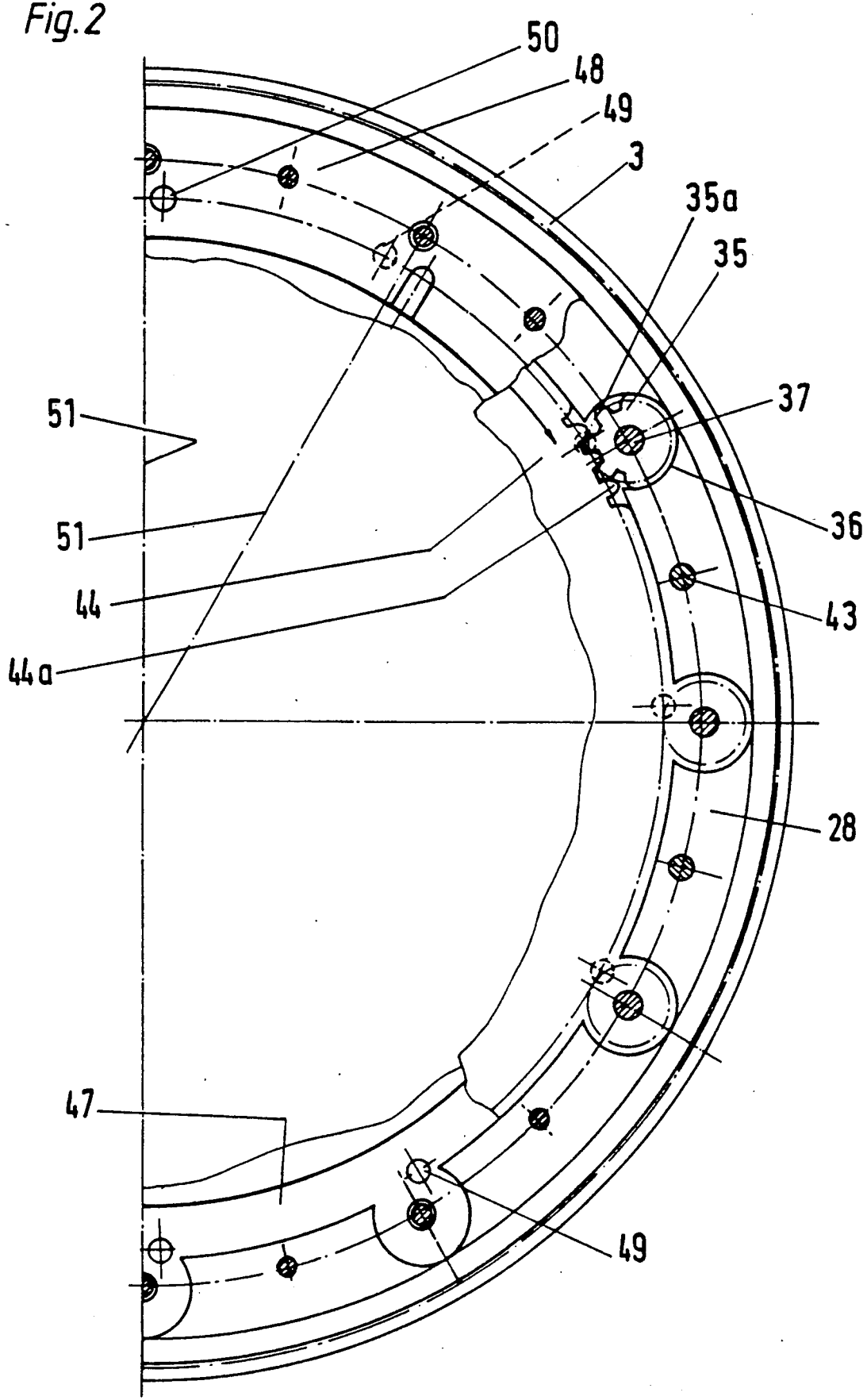

As can also be seen from FIG. 1 in conjunction with FIG. 2, the hydraulic damping system 13 that is radially outermost has pinions 35 that are distributed equally around the periphery of the annular extension 28 in the manner of planetary pinions. The pinions 35 are accommodated in axial recesses 36 that are made in the radial zone of extension of the annular extension 28 of the inertial mass 3 in this extension 28. The planetary pinions 35 are supported so as to be able to rotate within the cylindrical recesses 36, with the help of the pins 37. The pins 37 have a central area 38 that is of a greater diameter, on which the pinion 35 is arranged, and on both sides of this central area 36 an axial journal-like area 39, 40. In order to provide for radial retention of the pins 37 the journal-like areas 39, 40 extend into axial drillings 41, 42 that are made in the base of the axial recesses 36 as well as in the axially opposing areas of the wall 32. The wall 32 is connected to the flange 33 by riveted joints 43. As can be seen from FIG. 2, viewed in the peripheral direction of the system, these riveted joints 43 are arranged between the pinions 35.

The planetary pinions 35 engage with a sun gear 44 that is arranged radially within these pinions 35. Within the radial area of engagement between the teeth 35a of the pinions 35 and the teeth 44a of the sun gear 44 there is a circular turned groove in the annular extension 28 of the inertial mass 3, and this forms a chamber 45. In a similar manner, starting from the face side of the wall 32 that is proximate to the pinions 35, there is a turned groove in this wall and this forms a circular chamber 46. During a relative rotation between the inertial masses 3 and 4 a viscose medium that is delivered by means of a gear-type pump 13 is forced into one of these chambers 45, 46 and drawn from the other chamber 46, 45. On both sides of the pinions 35 there is a sealing plate or a sealing disk 47, 48 which can be displaced in an axial direction, and pressed against the pinions 35. To this end the chambers 45, 46 have a connection with the teeth of the pinions 35 and of the sun gear 44 that are in engagement with each other, which then displaces the medium that is to be delivered. In the embodiment shown, this connection is formed by recesses 49, 50 that are made in the sealing disks 47, 48 (see FIGS. 3 and 4). Pressure medium is either conducted to the side of the sealing disks 47, 48 that is remote from the pinions 35 or is drawn off from this side, through these recesses 49, 50, depending on the relative direction of rotation between the inertial masses 3 and 4; this will be described in greater detail below.

As can be seen from FIG. 2, the recesses 49, 50 that are associated with one pinion 35 are shifted relative to a line of connection 51 that extends through the rotational axis of the system 1 and the rotational axis of a pinion 35 in the direction of the periphery such that they lie on both sides of this straight line 51. In the embodiment shown the recesses 49, 50 are arranged so as to be symmetrical to this line 51.

Figure 3:
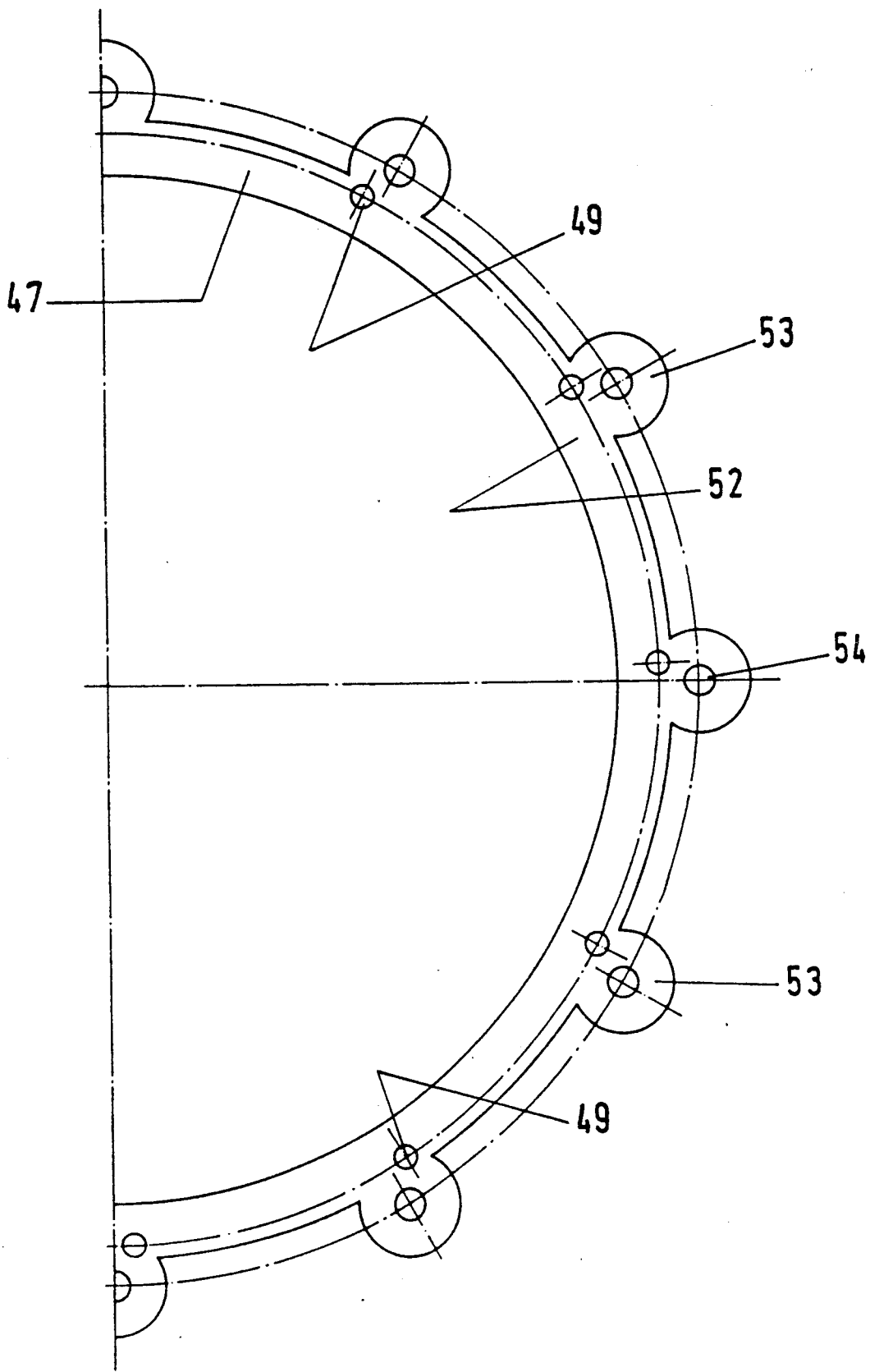
FIG. 3 shows a sealing plate for a gear-type pump which is provided between the two inertial masses of the system.

As can be seen from FIG. 3, the sealing disk 47 has a circular inner area 52 that has circular or disk-shaped radial extensions 53 on its radially outermost periphery; these are distributed equally around the periphery of the circular area 52. The radial extensions 53 are accommodated in the axial cut-outs 36 of the annular extension 28 of the inertial mass 3. The outside diameter of the disk-like extensions 53 is matched to the diameter of the axial cut-outs 36. Within the central area of the disk-like extensions 53 there is a cut-out 54, into which the middle area 38 of a pin 37 extends.

Figure 4:
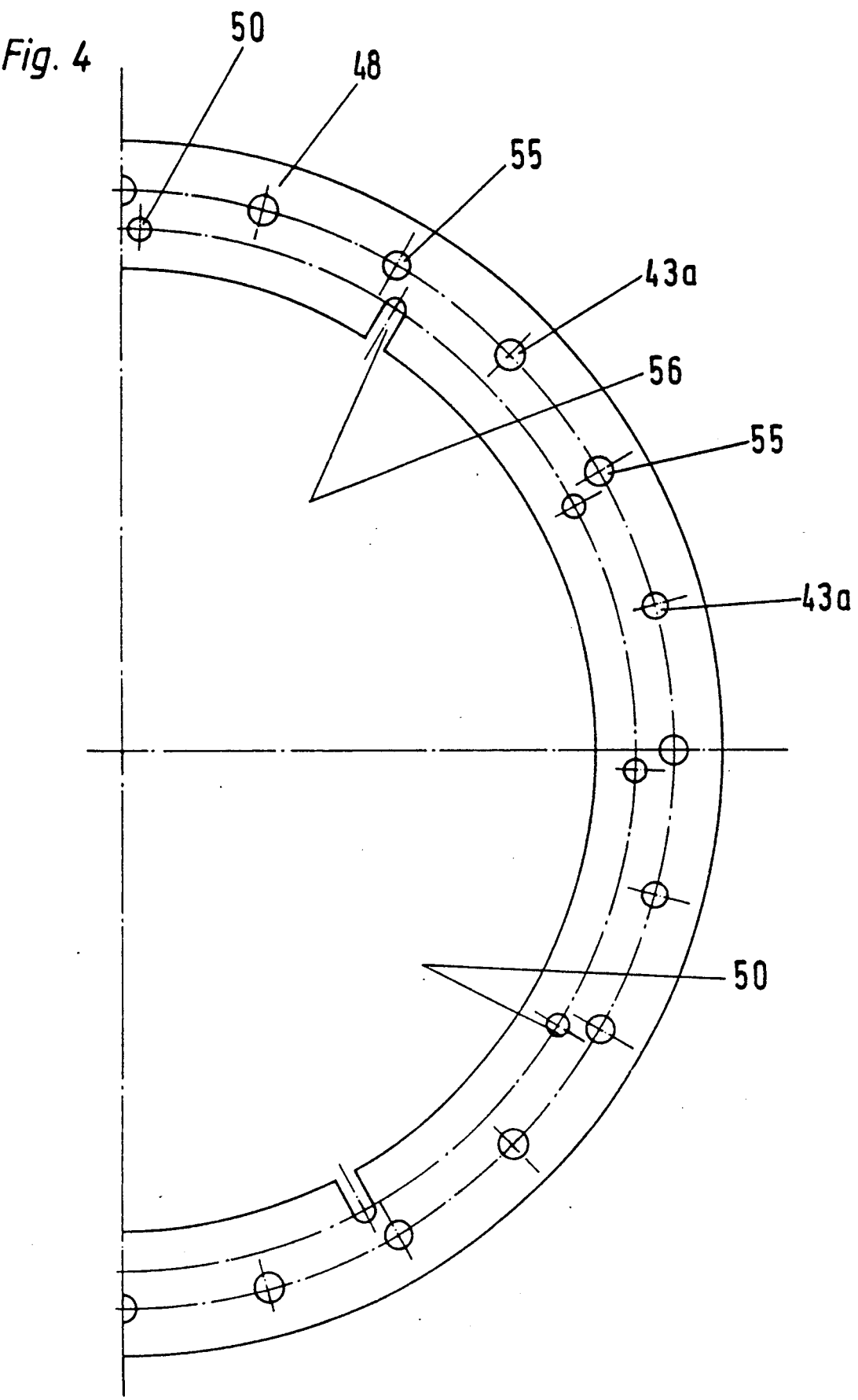
FIG. 4 shows a further sealing plate for the gear-type pump between the two inertial masses.

As can be seen from FIG. 4, apart from the connecting cut-outs 50, the sealing disk 48 also has cut-outs 55 in which the centre area 38 of the pins 37 also extend. In addition, the sealing disk 48 has slots 56 that extend radially; these extend from the radially innermost outline of the sealing disk 48 and extend radially outwards into the radial area of the chamber 46 such that this chamber 46 is connected through the radial slots 56 with the central annular chamber 30. In addition, there are passages 43a for the riveted joints 43 between the recesses or cut-outs 55.

It can be seen from FIGS. 1 and 2 that the flange-like sun gear 44 simultaneously forms the input section for the inner damping system 14 that is rotationally elastic in the direction of the periphery. The rotationally elastic damping system 14 also has a group of disks, namely the disks 27, 57 that are arranged on both sides of the sun gear 44, and which are rigidly connected with each other through the stand-off bolts 26 at an axial distance and are articulated onto the inertial mass 4. Within the disks 27, 57 as within the sun gear 44 there are axially aligned recesses 58, 59, and 60 within which the energy storage devices 34, which are in the form of coil springs 34 and which are effective in the peripheral direction, are accommodated.

The energy storage devices 34 counteract any relative rotation or twist between the sun gear 44 and the two disks 27, 57. The effective range of the innermost damping system 14 is determined by the length of the recesses 44b for the bolts 26 that extend in the peripheral direction and are made in the sun gear 44.

Between the two inertial masses 3 and 4 there is also a friction system 61 that acts in parallel to the rotationally elastic damping system 14. This friction system 61 provides for frictional damping between the two inertial masses 3 and 4. The friction disk 61a is controlled by the bolts 26. To this end the friction disk 61a has cut-outs 61b in which the rivet heads of the bolts can engage axially. In this connection, it can be advantageous if there is some peripheral free play between the sections 61b and the rivet heads.

In order to seal off the chamber 21 and thus prevent the egress of the lubricating or damping agent, there are sealing rings 64, 64a between the face side of the axial extension 28 and the wall 32 on the one hand and between the casing surface of the central drilling 62 of the wall 32 and the extension 63 of the inertial mass 4 that engages axially in these drillings 62; in the example shown in FIG. 1 these sealing rings 64, 64a are in the form of O-rings that can be accommodated in corresponding grooves. The sealing ring 64 is arranged radially beyond the pinions 35 or the axial recesses 36.

There is also a sealing ring 65 between the inner bearing ring 19 and the outer casing ring of the journal 20 in order to seal off the chamber 29, as well as a sealing ring 66 that is arranged in the area between the accommodating drilling 18 for the roller bearing 16 and the L-section ring 24. The sealing rings 65 and 66 are also in the form of O-rings that can be accommodated in suitable grooves.

The radially extending arms 23a, 24a, of the L-section rings 23, 24 also serve to seal off the chamber 29 to the outside, so that no damping or lubricating agent can escape through the bearing 16.

The operation of the gear-type pump 14 is described in greater detail below:

During tractive operation, which is to say when the gear box input shaft 10 is being driven by the internal combustion engine through the crankshaft 5 and the torque transmission system 1, viscose medium is drawn from the chamber 46 that then serves as the suction chamber or supply chamber for the pinions 35 and 44 and forced through the pinions into the chamber 45 that then serves as a pressure chamber. Because of the leakage losses resulting from the existing gaps, e.g., between the edges of the teeth and between the pressure side and the suction side of the gear-type pump, which are the result of production tolerances or which have been so dimensioned deliberately, viscose medium can escape from the pressure chamber 45, so that the pinions 35 are rotated by the sun gear 44 about the pins 37, so that there is a relative rotation or slippage between the two inertial masses 3 and 4. The speed of this unlimited relative rotation is dependent on the moment that is transmitted and on the moment that is transmitted from this that is at least approximately proportional to this. This means that during major and abrupt changes in moment the speed of slippage between the inertial masses 3 and 4 becomes greater, whereby these changes can be stopped or damped. The volume of viscose medium that is withdrawn from the chamber 46 because of leakage losses can flow into the chamber 46 from the annular chamber 30 through the radial slots 56.

In order to avoid major leakage losses in tractive operation, radially within the chamber 45 as well as axially between the contact surfaces of the inertial mass 3 for the sealing disk 47 and this axially displaceable sealing disk 47 there is a seal which, in the embodiment shown, is in the form of a O-ring 67. A turned groove is provided in the inertial mass 3 in order to accommodate this O-ring 67. The axial deformation of the O-ring 67 exerts an axial force on the disk 47 so that this is pressed against the pinions 35.

Because of the pressure that results in the chamber 45 the axially displaceable sealing disk 47 is pressed against the pinions 35, so that these pinions 35 are clamped between the sealing disk 47 and the sealing disk 48, which is supported axially on the inertial mass 4. Furthermore, the radially outer area of the sun gear 44, which extends radially between the two sealing disks 47, 48, is clamped between the two sealing disks 47, 48. The axial clamping of the pinions 35 and 44 means that during a relative rotational movement of these there is additional frictional damping between the pinions 35, 44 and the sealing disks 47, 48. The amount of frictional damping is dependent on the pressure existing within the pressure chamber 45.

In over-run operation, which is to say when a moment is transmitted to the internal combustion engine from the drive wheels of the vehicle, through the drive shaft 10 and the torque transmission system 1, viscose medium is drawn out of the chamber 45, which then serves as a suction chamber or supply chamber for the pinions 35 and 44, and is forced through the pinions into the chamber 46 that then serves as a pressure chamber. Because of the leakage losses, discussed above, and the channels between the pressure chamber 46 and the inner annular chamber 30 that are formed by the radial slots 56 of the sealing disk 48, viscose medium can be forced out of the pressure chamber 46. Because of these leakage losses or the predetermined delivery quantity of the pump 13, the pinions 35 can be rotated by the sun gear 44 which means that once again there is slippage between the inertial masses 3 and 4, this being dependent on the moment that results between the two inertial masses 3 and 4.

The desired slippage can be determined by the deliberate dimensioning of the slot 56, which can act in a manner similar to a choke. Because of this slot 56, the slippage between the two inertial masses 3 and 4 is greater in the over-run direction than it is in the tractive direction.

Furthermore, when the torque transmission system 1 is operating in the over-run mode, the viscose medium is drawn out of the chamber 45 by the gear-type pump 13 since this—apart from any possible leaks that there may be in it—has no connection with the annular chamber 30 that serves as a supply chamber for the viscose medium. This means that, after a specific operating time in the direction of over-run, the gear-type pump 13 free wheels, as it were, since the gear-type pump 13 is no longer supplied with viscose medium from the chamber 45 after a specific operating time in the over-run direction. During this operating phase there may be a negative pressure in the chamber 45, although this will amount, at most, to one bar.

During the over-run phase, as long as there is pressure in the chamber 46 the sealing disk 47 will be acted on axially against the pinions 35 and 44 so that these are clamped axially between the two sealing disks 47, 48. The effect of this clamping is that during the rotation of the pinions 35 and 44 there is frictional damping between these two pinions 35, 44 and the two sealing disks 47, 48. However, the frictional damping that occurs during over-run operation is less than when in tractive operation, since the pressure that builds up in the pressure chamber 46 is less than the pressure that builds up in the chamber 45 during tractive operation.

For some operational cases it can be advantageous if, in over-run operation, the frictional damping between the sealing disks 47, 48 and the pinions 35, 44 which is connected in parallel to the damping effect of the gear-type pump 13 is reduced to a minimum. This can be ensured by axial fixing of the sealing disk 48 relative to the wall 32. This axial fixing can be effected in that the recesses 55 (see FIG. 2) of the sealing disk 48 are matched to the outside diameter of the journal-like areas 40 on the pins 37, so that the sealing disk 48 is clamped axially between the centre areas 38 of the pins 37 and the wall 32, or can rest axially on the centre areas 38 of the pins 37, respectively. This ensures that when there is a pressure in the chamber 46 the sealing disk 48 can be supported on the flange 33 through the pins 37, which means that the pinions 35 and 44 cannot be clamped between the two sealing disks 47, 48.

The energy storage devices 34 of the rotationally elastic damper 14 that is connected in series with the gear-type pump are compressed corresponding to the moment that results between the two inertial masses 3 and 4, this being done until the torsional play that exists between the bolts 26 and the sections 44b of the sun gear or flange 44 that extend in the peripheral direction is applied. After this happens, the inner rotationally elastic damper 14 is blocked and only the outer gear-type pump 13 remains effective.

As can be seen particularly clearly from the section shown in FIG. 1, the construction of the torque transmission system 1 ensures that when the friction clutch 7 is operated the axial forces required to do this are absorbed by the bearing 15 so that the gear-type pump 13 is not affected, which means that the gear-type pump 13 is independent from the operation of the friction clutch 7, and the characteristics of the gear-type pump 13 are not affected by the operating force of the friction coupling 7.

Figure 5:
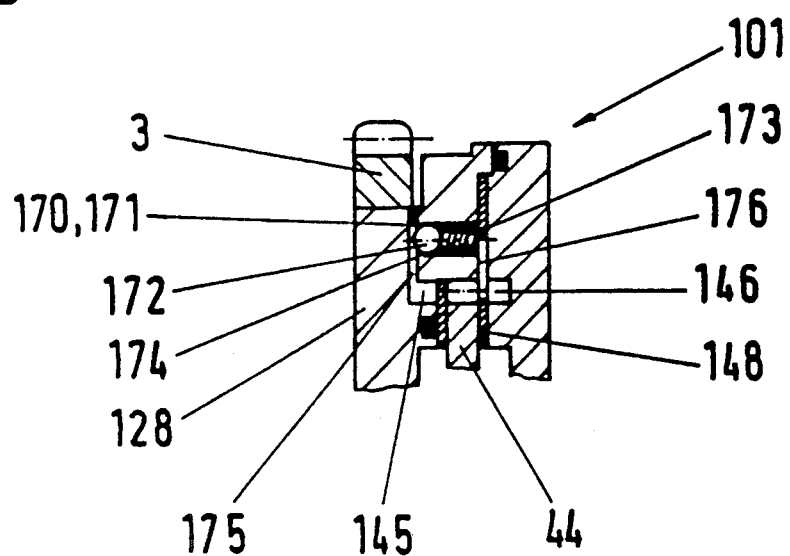
FIG. 5 shows a choke valve which can be used in the system of FIGS. 1 and 2.

In the torque transmission system 101 that is shown in part in FIG. 5 a pressure-limiting valve 170 is arranged between the chamber 145 that serves as a pressure chamber in tractive operation and the suction chamber 146. The pressure-limiting valve 170 is formed by an axial drilling 171, which, viewed in the peripheral direction, is made in the area between the pinions 35 (see FIG. 2) in the annular extension 128 and accommodates a closing body in the form of a plastic ball 172 and a closing spring in the form of a coil spring 173. The spring 173 acts on the ball 172 and forces it against the conical seat 174 formed by the drilling 171. The drilling 171 is, on the one hand, connected through a radial channel 175 with the chamber 145 and, on the other, through a radial slot 176 that is made in the sealing disk 148 with the chamber 146. The pressure at which the valve 170 opens can be defined by appropriate dimensioning of the initial tension of the spring 173. As soon as the valve opens at a specific pressure, which once again corresponds to a specific moment that occurs between the two inertial masses 3 and 4, there is greater slippage between the two inertial masses 3 and 4, since the viscose medium can escape from the pressure chamber 145 through the radial channel 175, the valve 170, and the radial slot 176 and into the chamber 146. This means that any undesired and abrupt changes in torque in the drive train of the internal combustion engine can be damped or decreased with the help of the pressure-limiting valve 170.

In a torque transmission system as shown in FIGS. 1 to 4 it is of course possible to provide a plurality of pressure-limiting valves 170 that are distributed equally about the periphery.

Figure 6:
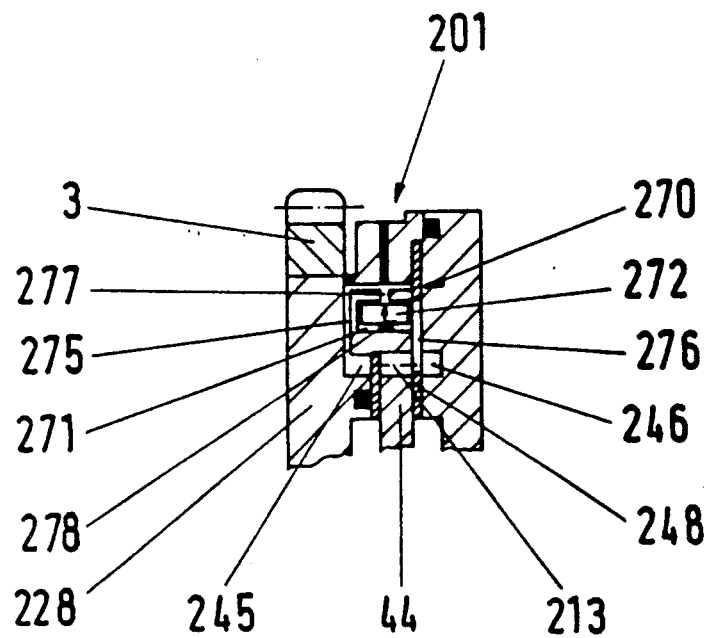
FIG. 6 shows a centrifugally operated valve which can be used in the system of FIGS. 1 and 2.

In the further embodiment 201 of the invention that is shown in part in FIG. 6 there is a choke valve 270 that is operated by centrifugal force. The valve 270 consists of a valve body in the form of a cylindrical roller 272, this being accommodated in a recess 271 that extends longways in a radial direction. The cylindrical roller closes a choke opening 277 during an outward radial movement brought about by the effects of centrifugal force, this opening 277 being connected through a channel 275 with the chamber 245 that forms the pressure chamber during tractive operation. The accommodating recess is also connected to the chamber 246 that acts as a suction chamber in tractive operation, through radial slots 276 that are made in the sealing disk 248. If there is a sufficiently high pressure in the chamber 245 viscose medium can be moved by the gear-type pump 213 through the channel 275, the centrifugal valve 270, and the radial slot 276 from the chamber 245 into the chamber 246. The slippage that occurs between the two inertial masses 3 and 4, or the relative rotational speeds between the two rotational masses 3 and 4, respectively, is determined by the volume of viscose medium that is moved. This volume is dependent on the moment that exists between the two inertial masses 3 and 4 as well as on the centrifugal force that acts on the cylindrical roller 272. The weight of the roller can be so selected that in a certain rotational speed range of the internal combustion engine above the idling speed and under normal operating conditions the choke opening 277 is closed, so that either there is no slippage between the two inertial masses 3 and 4 or else this slippage is reduced to a minimum, which is to say to the minimum that is conditioned by the poor sealing in the hydrostatic damper 213 or in the hydrostatic coupling 213. In the range of lower rotational speeds, e.g., below or close to idling speed, the choke valve can open even during a slight rise in pressure in the chamber 245.

The characteristics or the characteristic curve of the choke valve 270 that operates according to centrifugal force can be influenced by an energy-storage device that acts on the valve body 272, depending on operational conditions or the desired characteristics of the gear-type pump 213, respectively, or of the hydrostatic damper 213 or the hydrostatic coupling 213, respectively. For example, as is shown schematically in FIG. 6, an energy storage device 278, such as, for example, a spring, can be provided, this then pressing the valve body 272 radially outwards against the choke opening 277, so that even when the torque transmission system is not rotating, the choke opening 277 is closed. Only when there is a sufficiently large over-pressure in the chamber 245 can the choke valve 270 be opened against the force of the spring 278 and, optionally, against the centrifugal force that is acting on the valve body 272.

According to a further embodiment, not shown herein, there can also be an energy storage device that forces the valve body 272 radially inwards, so that the centrifugal force that acts on the valve body 272 during the rotation of the torque transmission system has to overcome this energy storage device in order to close the choke opening 277.

The choke valve 270 as shown in FIG. 6 can be arranged in a manner similar to the pressure-limiting valve as in FIG. 4, in the peripheral direction between the pinions 35 as shown in FIG. 1. For many applications, it can be advantageous if both pressure-limiting valves 170 and the choke valves 270 that operate by centrifugal force are used in the system.

Figure 7:
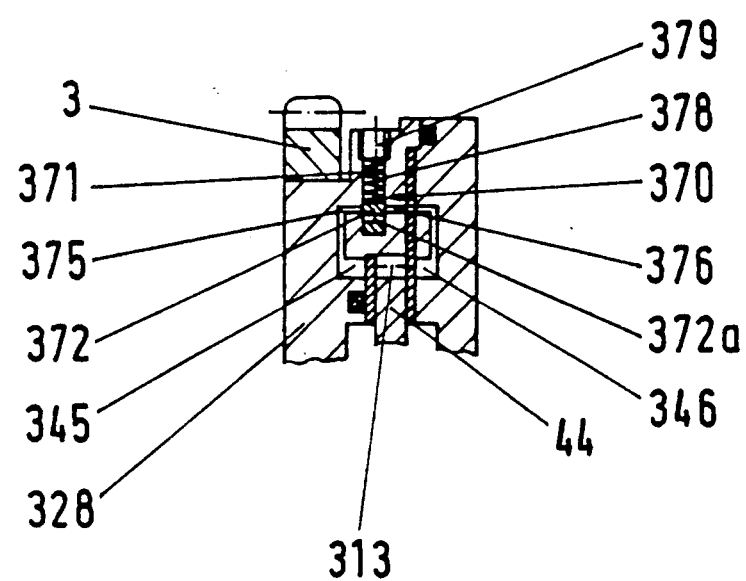
FIG. 7 shows another centrifugally operated valve which can be used in the system of FIGS. 1 and 2.

FIG. 7 shows a further valve that can be used in a torque transmission system according to the present invention. This valve 370 is also operated by centrifugal force and has a valve body 372 that is forced inwards by means of an energy storage device 378. The energy storage device 378 and the valve body 372 are accommodated in a radial drilling 371 made in the inertial mass 3. The radial drilling 371 is closed by means of a screw 379 that rests against the energy storage device 378. The pretension in the energy storage device 378 can be adjusted by means of the screw 379. Channels 375 and 376 extend from the drilling 371 and these are connected with the chambers 345, 346, that correspond to the chambers 45 and 46 shown in FIG. 1. The valve body 372 has a drilling 372a through which the two channels 375, 376 can be connected. The drilling 372a is so arranged and the energy storage device 378 is such that when the internal combustion engine is operating in a low speed range, e.g., below idling speed, the drilling 372a is displaced radially relative to the channels 375, 376, so that there is no connection between these channels. This means that no viscose medium can pass through the channels 375, 376 from the pressure side to the suction side of the gear-type pump 313. In a medium speed range the drilling 372a covers off the channels 375 and 376, so that viscose medium can then circulate through the valve 370. As the speed increases the centrifugal force acting on the valve body 372 becomes greater, so that the energy storage device 378 is further compressed and thus the drilling 372a moves outwards relative to the channels 375, 376, which means that the connection between the two channels 375 and 376 is broken in a higher speed range. Thus, when the internal combustion engine is running at a higher rotational speed no viscose medium can circulate through the valve 370.

The characteristics or the characteristic curve of the valve 370 shown in FIG. 7 can be matched by suitable configuration of the energy storage device 378 and the shape of the drilling 372 to the particular application. It can be advantageous if the energy storage device 378 does not have a linear characteristic curve.

According to a further embodiment, not shown herein, the valve body 372 of the valve 370 as shown in FIG. 7 can have a plurality of drillings that can connect the channels 375, 376. These drillings can be so made in the valve body 372 such that when the internal combustion engine is operating in a lower speed range there is a connection between the two channels 375, 376; in a mid-range, this connection is broken; and in a higher speed range, this connection between the channels 375, 376 is re-established through a drilling in the valve body 372 that lies radially further inside the assembly.

In the embodiment of the torque transmission system that is shown in FIG. 1 the clutch plate 9 is configured as a rigid plate. However, for many applications it may be advantageous if a clutch plate with a torsion damper is used. The torsion damper of the clutch plate can be a multi-stage device, wherein at least one stage can be used for the idling range and at least one stage can be used for the load range. However, for many applications it may be expedient if the clutch plate only has a torsion damper for the idling speed range. In addition, the torsion damper used in the clutch plate can incorporate at least one friction clutch. The friction clutch can have a plurality of friction stages, that become effective in sequence and can form a so-called load friction coupling or a delayed friction coupling.

I claim:

1. A torque transmission system in a drive train of a motor vehicle between an engine and a gear box, comprising at least two inertial masses including first and second masses which are rotatable relative to each other, one of which is connectable with the engine and the other of which is connectable with and disconnectable from the gear box by way of an engageable clutch; and a hydraulic force transmitting unit between said one mass and the other of said first and second masses, said unit being operative to transmit torque by way of a pressurized hydraulic medium, the transmission of torque taking place from the engine to said one mass, from said one mass to said other mass by way of said unit, and from said other mass to the gear box by way of the engaged clutch, said system being devoid of stops which would limit rotation of said masses relative to each other.

2. A system as defined in claim 1, wherein said unit is a hydraulic clutch.

3. A system as defined in claim 2, wherein said hydraulic clutch is a hydrostatic clutch.

4. A system as defined in claim 1 wherein said unit is a displacement pump that operates according to the rotational principle.

5. A system according to claim 1, wherein between said unit is a gear-type pump.

6. A system according to claim 1, wherein said unit comprises a hydrostatic damping system operating with limited slippage.

7. A system as defined in claim 1, wherein said medium is a paste-like medium.

8. The system of claim 1 for transmission of torque from an engine having a crankshaft, wherein said unit has an input section and an output section and the transmission of torque takes place from the crankshaft to said one mass, from said one mass to said input section, from said input section to said output section, from said output section to said other mass, and from said other mass to said clutch.

9. A system according to claim 1, wherein said unit has a plurality of planetary pinions disposed around the axes of rotation of said masses.

10. A system according to claim 9, wherein said unit further includes a sun gear meshing with said planetary pinions.

11. A system according to claim 10, wherein said planetary pinions surround said sun gear.

12. A system according to claim 10, further comprising a sealing plate adjacent one side of said pinions.

13. A system according to claim 12, wherein said sealing plate has a side remote from said planetary pinions and said unit has a pressure side connected to said side of said sealing plate.

14. A system according to claim 13, further comprising an energy storage device acting upon said side of the sealing plate.

15. A system according to claim 12, wherein the sealing plate and the pinions are connected to each other and form a circular component.

16. A system according to claim 10, further comprising pins rotatably mounting said pinions.

17. A system according to claim 10, wherein the pinions are supported by the first inertial mass and the sun gear is installed on the second inertial mass.

18. A system according to claim 1, wherein said unit has a pressure side and a suction side and further comprising a choke between said sides.

19. A system according to claim 1, wherein said unit has a pressure side and a suction side and further comprising a non-return valve between said sides.

20. A system according to claim 18, wherein said choke includes a choke valve.

21. A system according to claim 20, wherein the choke valve is a non-return valve.

22. A system according to claim 1, wherein said unit comprises planet pinions each having a pressure side and a suction side, and further comprising a choke between the pressure side and the suction side of each pinion.

23. A system according to claim 18, further comprising means for changing the choking effect of said choke as a function of specific operating conditions.

24. A system according to claim 23, wherein the choking effect can be changed as a function of the rotational speed of at least one of said inertial masses.

25. A system according to claim 23, wherein the choking effect can be changed as a function of the temperature of hydraulic medium that is delivered or displaced by said unit.

26. A system according to claim 1, further comprising a rotationally elastic damper between the hydraulic unit and at least one of the inertial masses.

27. A system according to claim 1, further comprising frictional damping means between the inertial masses.

28. A system according to claim 26, wherein the rotationally elastic damper has an input section, an output section and energy storage devices disposed between said sections and acting in the circumferential direction of said masses.

29. A system according to claim 26, wherein the hydraulic unit and the rotationally elastic damper are connected in series.

30. A system according to claim 26, wherein said damper has an input section and an output section and said unit comprises a sun gear supported by one of said sections.

31. A system according to claim 26, wherein said damper comprises means for transmitting torque between said hydraulic unit and said other inertial mass.

32. A system as defined in claim 26, wherein the rotationally elastic damper is provided radially inwardly of said unit.

33. A system as defined in claim 26, wherein the rotationally elastic damper and the hydraulic unit are arranged at least approximately on the same axial level.

34. A system as defined in claim 26, wherein said unit comprises a sun gear and said damper has an input section integral with said sun gear.

35. A system as defined in claim 26, wherein said damper has an output section including two axially spaced disks and an input section including a flange between said disks.

36. A system as defined in claim 35, wherein the flange extends radially beyond said disks and said unit has planetary pinions and a sun gear mating with said pinions and provided at the periphery of said flange.

37. A system as defined in claim 1, wherein the hydraulic medium is a viscous medium and said first mass has a chamber for said unit, said chamber being filled at least in part with the hydraulic medium, and further comprising a rotationally elastic damper in said chamber.

38. A system as defined in claim 37, wherein the chamber is an annular chamber and is defined by components of said first mass.

39. A system as defined in claim 38, wherein said components include an outer wall which surrounds the rotationally elastic damper as well as sidewalls extending radially inwardly from said outer wall and flanking said said rotationally elastic damper.

40. A system according to claim 37, wherein said chamber is provided in said one mass.

41. A system as defined in claim 39, wherein one of said sidewalls extends radially between the rotationally elastic damper and the second inertial mass, said one sidewall and said second mass having radially innermost portions and further comprising a seal between said radially innermost portions.

42. A system as defined in claim 41, wherein said outer wall includes an annular rim which extends axially of said masses and said one sidewall extends radially between the rotationally elastic damper and the other inertial mass and is secured to said rim.

43. A system as defined in claim 42, wherein said unit has planetary pinions and said rim has axial cutouts for said planetary pinions.

44. A system as defined in claim 43, wherein said one sidewall closes off said cutouts in the axial direction of said masses.

45. A system as defined in claim 43, wherein said rim has a side face and said one sidewall is secured to said side face.

46. A system as defined in claim 45, further comprising a seal radially outside said planetary pinions between the side face of said rim said one sidewall.

47. A system according to claim 37, wherein the viscous medium only partially fills said chamber.

48. The system of claim 1 for transmission of torque from an engine having a crankshaft, wherein said unit includes a hydraulic clutch having an input section and an output section and further comprising a damper between said unit and at least one of said first and second masses, the transmission of torque from the engine to the gear box taking place from the crankshaft to said one mass, from said one mass to said input section, from said input section to said output section, from said output section to said damper, from said damper to said other mass, and from said other mass to said engageable clutch.

49. The system of claim 1 for transmission of torque to a gear box having an input shaft, wherein said clutch is a friction clutch and comprises a pressure plate and a clutch plate adjacent said pressure plate and non-rotatably connected with the input shaft, said other mass having at least one friction surface adjacent said clutch plate and said pressure plate being non-rotatably but axially movably connected to said other mass, said clutch plate being located between said friction surface and said pressure plate.

50. A system as defined in claim 1 wherein the slippage between the two inertial masses amounts to between 20 and 200 revolutions per minute.

51. A torque transmission system, particularly a torque transmission system which is provided in a drive train of a motor vehicle between an engine and a gear box, comprising at least two inertial masses which are rotatable relative to each other, one of which is connectable with the engine and the other of which is connectable with and disconnectable from the gear box by way of a clutch; and a hydraulic torque transmitting unit coupling said masses and operative to transmit the entire torque between said masses by way of a pressurized hydraulic fluid.

52. The system of claim 51, further comprising an elastically yieldable damper acting between said masses.

53. The system of claim 51, wherein said torque transmitting unit comprises a chamber which is defined, at least in part, by one of said inertial masses.

54. The system of claim 53, further comprising a cover which is affixed to said one inertial mass and overlies said chamber.

* * * * *